United States Patent
Shan

(10) Patent No.: US 11,838,839 B2
(45) Date of Patent: Dec. 5, 2023

(54) V2X POLICY AND PARAMETERS PROVISIONING TO USER EQUIPMENT BY A POLICY AND CONTROL FUNCTION

(71) Applicant: APPLE INC., Cupertino, CA (US)

(72) Inventor: Changhong Shan, Portland, OR (US)

(73) Assignee: APPLE INC., Cupertino, CA (US)

( * ) Notice: Subject to any disclaimer, the term of this patent is extended or adjusted under 35 U.S.C. 154(b) by 344 days.

(21) Appl. No.: 17/288,850

(22) PCT Filed: Nov. 5, 2019

(86) PCT No.: PCT/US2019/059797
§ 371 (c)(1),
(2) Date: Apr. 26, 2021

(87) PCT Pub. No.: WO2020/097031
PCT Pub. Date: May 14, 2020

(65) Prior Publication Data
US 2022/0007161 A1    Jan. 6, 2022

Related U.S. Application Data

(60) Provisional application No. 62/757,715, filed on Nov. 8, 2018.

(51) Int. Cl.
*H04W 4/50* (2018.01)
*H04W 4/40* (2018.01)
(Continued)

(52) U.S. Cl.
CPC ............... *H04W 4/50* (2018.02); *H04W 4/40* (2018.02); *H04W 8/02* (2013.01); *H04W 48/18* (2013.01); *H04W 60/00* (2013.01)

(58) Field of Classification Search
CPC ..... H04W 76/25; H04W 76/15; H04W 8/005; H04W 50/04; H04W 4/06; H04W 4/24
See application file for complete search history.

(56) References Cited

U.S. PATENT DOCUMENTS 10,932,104 B2 * 2/2021 Karampatsis ........... H04L 67/61
10,965,479 B2 * 3/2021 Atarius ................. H04M 15/66
(Continued)

FOREIGN PATENT DOCUMENTS

WO         2018066876 A1    12/2018
WO     WO-2020069289 A1 *   4/2020    .............. H04W 4/06

OTHER PUBLICATIONS

A. Kunz, L. Nkenyereye and J. Song, "5G Evolution of Cellular IoT for V2X," 2018 IEEE Conference on Standards for Communications and Networking (CSCN), Paris, France, 2018, pp. 1-6, doi: 10.1109/CSCN.2018.8581830. (Year: 2018).*
(Continued)

*Primary Examiner* — William D Cumming
(74) *Attorney, Agent, or Firm* — Dorsey & Whitney LLP

(57) ABSTRACT

Systems and methods provide solutions for provisioning vehicle-to-everything (V2X) policy and parameters to a user equipment (UE). A UE may generate a registration request to register with a wireless network. The registration request may include a first indication of a V2X policy provisioning request. The UE processes a message from a policy control (Continued)

function (PCF) including either a current V2X policy and corresponding parameters or a second indication that the PCF does not support V2X provisioning.

17 Claims, 13 Drawing Sheets

(51) Int. Cl.
*H04W 8/02* (2009.01)
*H04W 48/18* (2009.01)
*H04W 60/00* (2009.01)

(56) References Cited

U.S. PATENT DOCUMENTS

| | | | |
|---|---|---|---|
| 11,432,135 B2* | 8/2022 | Shan | H04L 12/1403 |
| 2017/0288886 A1* | 10/2017 | Atarius | H04L 47/20 |
| 2019/0289459 A1* | 9/2019 | Shan | H04W 76/25 |
| 2019/0394624 A1* | 12/2019 | Karampatsis | H04W 76/15 |
| 2020/0120589 A1* | 4/2020 | Velev | H04W 76/25 |
| 2021/0212138 A1* | 7/2021 | Ali | H04W 8/005 |
| 2022/0007161 A1* | 1/2022 | Shan | H04W 60/04 |
| 2023/0063242 A1* | 3/2023 | Shan | H04W 4/24 |

OTHER PUBLICATIONS

3GPP TR 23.786, "3rd Generation Partnership Project; Technical Specification Group Services and System Aspects; Study on architecture enhancements for EPS and 5G System to support advanced V2X services (Release 16)", V0.9.0, Oct. 2018, 91 pages.

3GPP TS 23.502, et al.,"3rd Generation Partnership Project; Technical Specification Group Services and System Aspects; Procedures for the 5G System; Stage 2 (Release 15), V15.3.0", Sep. 2018, 330 pages.

Intel, et al.,"eV2X Solution #20 Update, S2-1810547, 3GPP TSG SA WG2 Meeting #129, Dongguan, China, Agenda 6.6 (revision of S2-18xxxxx)", Oct. 15-19, 2018, 3 pages.

Intel, Samsung, Qualcomm, et al.,"eV2X solution #3 update, S2-1810838, 3GPP TSG SA WG2 Meeting #129, Dongguan, China (revision of S2-1810544)", Oct. 15-19, 2018, 3 pages.

LG Electronics, et al.,"Solution#18 update, S2-1810287, SA WG2 Meeting #129, Dongguan, P. R. China, Agenda Item 6.6 (revision of S2-18xxxx)", Oct. 15-19, 2018, 6 pages.

PCT/US2019/059797, et al., International Search Report and Written Opinion, dated Feb. 24, 2020, 10 pages.

* cited by examiner

V2X POLICY AND PARAMETERS PROVISIONING TO USER EQUIPMENT BY A POLICY AND CONTROL FUNCTION

CROSS-REFERENCE TO RELATED APPLICATION(S)

This application is a national stage filing under 35 U.S.C. § 371 of International Patent Application No. PCT/US2019/059797, filed Nov. 5, 2019 which claims the benefit of U.S. Provisional Application No. 62/757,715, filed Nov. 8, 2018, each of which is hereby incorporated by reference herein in its entirety.

TECHNICAL FIELD

This application relates generally to wireless communication systems, and more specifically to provisioning vehicle-to-everything (V2X) policy and parameters to a user equipment (UE).

BACKGROUND

This application relates generally to wireless communication systems, and more specifically to reliable data service for unstructured data.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB). Fifth generation may also be referred to herein as next generation (NG).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
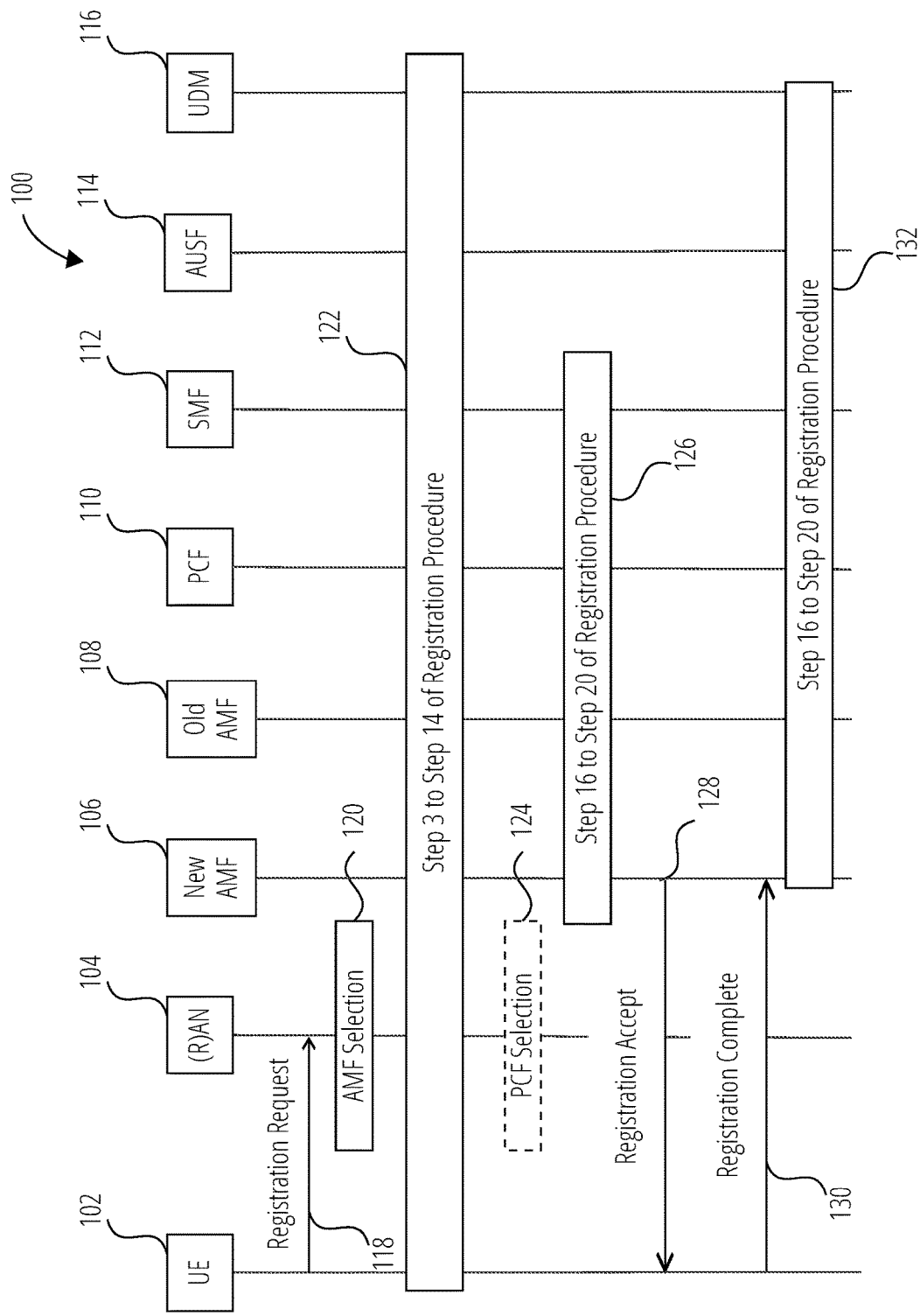
FIG. 1 illustrates a registration procedure for a V2X policy provisioning request in accordance with one embodiment.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

One or more embodiments described herein are related to one or more 3GPP specifications. Examples of these specifications include, but are not limited to, one or more 3GPP NR specifications and one or more specifications directed and/or related to 5G mobile networks/systems and/system architecture 1 (SA1).

As indicated in 3GPP technical report (TR) 23.786, to enable a UE to use enhanced vehicle-to-everything (eV2X) service in a 5G system, service authorization and provisioning for eV2X communication over an NG-Uu reference point is needed. However, detailed policy and parameters provisioned to a UE for NG-Uu communication still require further study. That is, the detailed policy and parameters provisioned to a UE for NG-Uu communication are undefined or missing. Some of the parameters provisioned to a UE for NG-Uu communication were defined in 3GPP technical specification (TS) 23.285 for evolved packet system (EPS) based V2X. However, there is no solution for 5G system (5GS) based V2X yet, even though some new parameters have been added.

Embodiments described herein are directed to defining detailed policy and parameters provisioned to a UE for next generation air interface (NG-Uu) communication, where the policy and parameters are provisioned to a UE by a policy control function (PCF) as part of a UE policy container. In one embodiment, in an initial registration request message, the indication of a V2X policy provisioning request is included in a UE policy container.

In certain embodiments, authorization policy and corresponding parameters for V2X or eV2X communications over NG-Uu reference point are provisioned to a UE connected to a 5G core network (5GC) as part of a UE policy container by a PCF using, for example, the procedure defined in clause 4.2.4.3 of 3GPP TS 23.502. Beyond what is provided, for example, in 3GPP TS 23.285 for EPS based V2X, certain embodiments include V2X policy and corresponding parameters comprising information for mapping of the V2X services (e.g., provider service identifier (PSID) or intelligent transport systems application identifier (ITS-AID) of the V2X application) to: protocol data unit (PDU) session type (internet protocol (IP) type or unstructured type); session and service continuity (SSC) mode; single network slice selection assistance information (S-NSSAI(s)); and/or data network name(s) (DNN(s)). Such information may be used by a UE as a UE local configuration when associating the V2X application to a PDU session as defined in 3GPP's TS 23.503.

In addition, or in other embodiments, the information in the V2X policy may include a 3GPP radio access technology (RAT) preference (e.g., Evolved Universal Terrestrial Radio Access (E-UTRA), New Radio (NR), or another RAT preference). The mapping information between V2X services and the 3GPP RAT preference may be used to assist the UE in selecting a 3GPP RAT connected to 5G core network.

In certain embodiments, if the PDU session type is IP type, the V2X policy and corresponding parameters may include information for mapping of the V2X services (e.g. PSID or ITS-AIDs of the V2X application) to V2X application server address information (including IP address/fully qualified domain names (FQDN) and user datagram protocol (UDP) port) for unicast. In certain such embodiments, the V2X policy and corresponding parameters also includes a list of FQDNs or IP addresses of the V2X application servers, associated with served geographical area information and list of public land mobile networks (PLMNs) to which the configuration applies.

In certain embodiments, a UE includes an indication of a V2X policy provisioning request in a registration request of a registration procedure. In a UE configuration update procedure for transparent UE policy delivery, based on the indication of the V2X policy provisioning request in a UE policy container, a PCF determines whether to send the V2X policy and parameters to the UE via the UE policy container or an indication of not supporting V2X policy provisioning.

FIG. 1 illustrates a registration procedure 100 for a V2X policy provisioning request according to one embodiment. The registration procedure 100 show in FIG. 1 is provided by way of example only and skilled persons will recognize from the disclosure herein that other registration procedures may be used and that such registration procedures may involve a different set of entities or functions. The example entities or functions involved in the registration procedure 100 shown in FIG. 1 include a UE 102, a RAN or other access network (shown as (R)AN 104), a new access and mobility management function (AMF) (shown as new AMF 106), an old AMF 108, a PCF 110, a session management function (SMF) (shown as SMF 112), an authentication server function (shown as AUSF 114), and a unified data management function (shown as UDM 116).

To initiate the registration procedure 100, the UE 102 sends a registration request 118 to the (R)AN 104. The registration request 118 includes a UE policy container including a list of public service identifiers (PSIs), an indication of UE support for Access Network Discovery & Selection Policy (ANDSP), and an indication of V2X policy provisioning request.

The registration request 118 may also include, for example, Registration type, Subscription Concealed Identifier (SUCI) or 5G Globally Unique Temporary Identifier (5G-GUTI) or Permanent Equipment Identifier (PEI), last visited TAI (if available), Security parameters, Requested Network Slice Selection Assistance Information (NSSAI), Mapping Of Requested NSSAI, Default Configured NSSAI indication, UE Radio capability Update, UE Mobile Management (MM) Core Network capability, PDU session status, List Of PDU Sessions To Be Activated, Follow-on request, Mobile Initiated connection Only (MICO) mode preference, Requested Discontinuous Reception (DRX) parameters, Local Area Data Network (LADN) DNN(s) or Indicator Of Requesting LADN Information.

Additional details for the registration request 118, an AMF selection 120, a step 3 to step 14 of registration procedure 122, a PCF selection 124, a step 16 to step 20 of registration procedure 126, a registration accept message 128, a registration complete message 130, and a step 23 to step 24 of registration procedure 132 may be found, for example, in 3GPP TS 23.502, clause 4.2.2.2.2, which is hereby incorporated by reference herein.

In certain embodiments, the PCF 110 may determine that it does not support V2X policy provisioning and/or that the latest V2X policy is not available in the PCF 110. In response to this determination, the registration accept message 128 may include an indication to the UE 102 that the PCF 110 does not support V2X policy provisioning and/or that the latest V2X policy is not available in the PCF 110.

Figure 2:
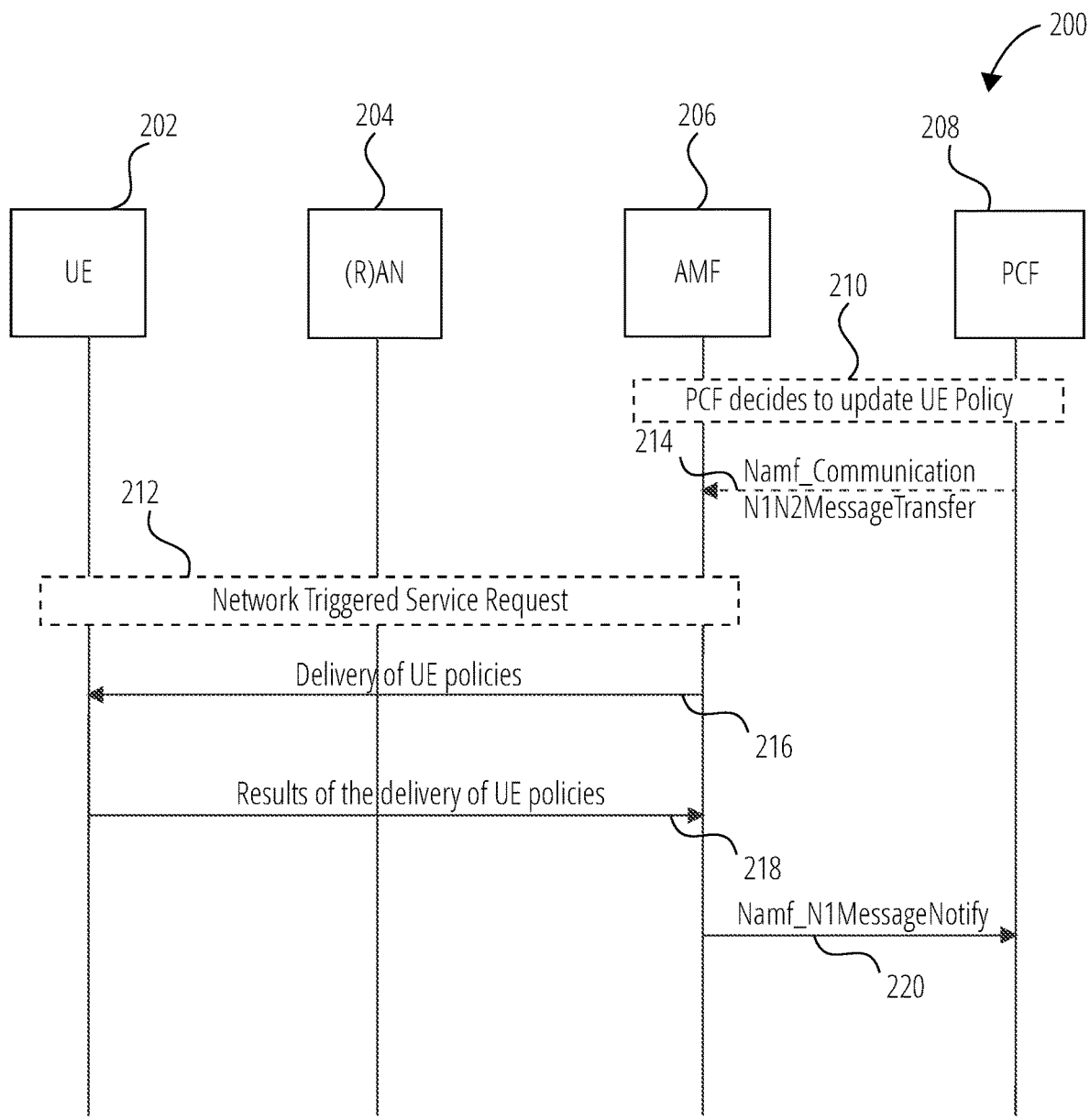
FIG. 2 illustrates a UE configuration update procedure in accordance with one embodiment.

In certain embodiments, access control parameters, including V2X policy and corresponding parameters, are provisioned to a UE in a UE configuration update procedure initiated by an AMF or PCF. For example, FIG. 2 illustrates an example UE configuration update procedure 200 according to one embodiment. The UE configuration update procedure 200 includes cooperation between a UE 202, a RAN or other access network (shown as (R)AN 204), an access and mobility management function (shown as AMF 206), and a policy control function (shown as PCF 208). The UE configuration update procedure 200 is initiated when the PCF 208 decides to update UE policy 210. The PCF 208 may decide to update the UE 202 access selection and protocol data unit (PDU) session selection related policy information (i.e., UE policy) in the UE configuration. In the non-roaming case, the visited PCF (V-PCF) is not involved and the role of the home PCF (H-PCF) is performed by the PCF. For the roaming scenarios, the V-PCF interacts with the AMF 206 and the H-PCF interacts with the V-PCF. The PCF 208 may decide to update the UE policy procedures based on triggering conditions such as an initial registration, registration with 5G system (5GS) when the UE moves from evolved packet system (EPS) to 5GS, or updates UE policy.

For example, for the case of initial registration and registration with 5GS when the UE 202 moves from EPS to 5GS, the PCF 208 compares the list of public service identifiers (PSIs) included in the UE access selection and PDU session selection related policy information in Npcf_UEPolicyControl_Create request and determines whether UE access selection and PDU session selection related policy information are to be updated and provided to the UE 202 via the AMF 206 using a DL NAS TRANSPORT message.

In certain embodiments, based on an indication of a V2X policy provisioning request in a UE policy container, the PCF 208 determines whether to send V2X policy and parameters to the UE 202 via UE policy container or the indication of not supporting V2X policy provisioning.

As another example, for the network triggered UE policy update case (e.g., the change of UE location, the change of subscribed single network slice selection assistance information (S-NSSAI) as described in clause 6.1.2.2.2 of 3GPP TS 23.503), the PCF 208 checks the latest list of PSIs to decide which UE access selection and/or PDU session selection related policies to send to the UE 202.

The PCF 208 may check if the size of the resulting UE access selection and PDU session selection related policy information exceeds a predefined limit. If the size is under the limit, then UE access selection and PDU session selection related policy information are included in a single Namf_Communication_N1N2MessageTransfer service operation 214 as described below. If the size exceeds the predefined limit, the PCF 208 splits the UE access selection and PDU session selection related policy information in smaller, logically independent UE access selection and PDU session selection related policy information ensuring the size of each is under the predefined limit. Each UE access selection and PDU session selection related policy information may then be sent in a separate Namf_Communication_N1N2MessageTransfer service operation 214 as described below.

The NAS messages from the AMF 206 to the UE 202 may not exceed the maximum size limit allowed in NG-RAN (PDCP layer), so the predefined size limit in PCF 208 may be related to that limitation. The mechanism used to split the UE access selection and PDU session selection related policy information is described in 3GPP TS 29.507.

The PCF 208 invokes the Namf_Communication_N1N2MessageTransfer service operation 214 provided by the AMF 206. The message may include SUPI and a UE policy container.

In a network triggered service request 212, if the UE 202 is registered and reachable by the AMF 206 in either 3GPP access or non-3GPP access, the AMF 206 transfers transparently the UE policy container to the UE 202 via the registered and reachable access. If the UE 202 is registered in both 3GPP and non-3GPP accesses and reachable on both access and served by the same AMF 206, the AMF 206 transfers transparently the UE policy container to the UE 202 via one of the accesses based on the AMF local policy. If the UE 202 is not reachable by AMF over both 3GPP access and non-3GPP access, the AMF 206 reports to the PCF 208 that the UE policy container could not be delivered to the UE 202 using Namf_Communication_N1N2TransferFailureNotification.

If the AMF 206 decides to transfer transparently the UE policy container to the UE 202 via 3GPP access, e.g. the UE 202 is registered and reachable by AMF in 3GPP access only, or if the UE 202 is registered and reachable by AMF in both 3GPP and non-3GPP accesses served by the same AMF and the AMF 206 decides to transfer transparently the UE policy container to the UE 202 via 3GPP access based on local policy, and the UE 202 is in CM-IDLE and reachable by AMF in 3GPP access, the AMF 206 starts the paging procedure by sending a paging message. Upon reception of paging request, the UE 202 may initiate a UE triggered service request procedure.

In a delivery 216 of UE policies, if the UE 202 is in CM-CONNECTED over 3GPP access or non-3GPP access, the AMF 206 transfers transparently the UE policy container (UE access selection and PDU session selection related policy information) received from the PCF 208 to the UE 202. The UE policy container may include the list of policy sections as described in 3GPP TS 23.503. The UE 202 updates the UE policy provided by the PCF 208 and sends the results 218 of the delivery of UE policies to the AMF 206.

If the AMF 206 received the UE policy container and the PCF 208 subscribed to be notified of the reception of the UE policy container then the AMF 206 forwards the response of the UE 202 to the PCF 208 using a Namf_N1MessageNotify operation 220. The PCF 208 maintains the latest list of PSIs delivered to the UE 202 and updates the latest list of PSIs in the UDR by invoking Nudr_DM_Update (SUPI, Policy Data, Policy Set Entry, updated PSI data) service operation.

Figure 3:
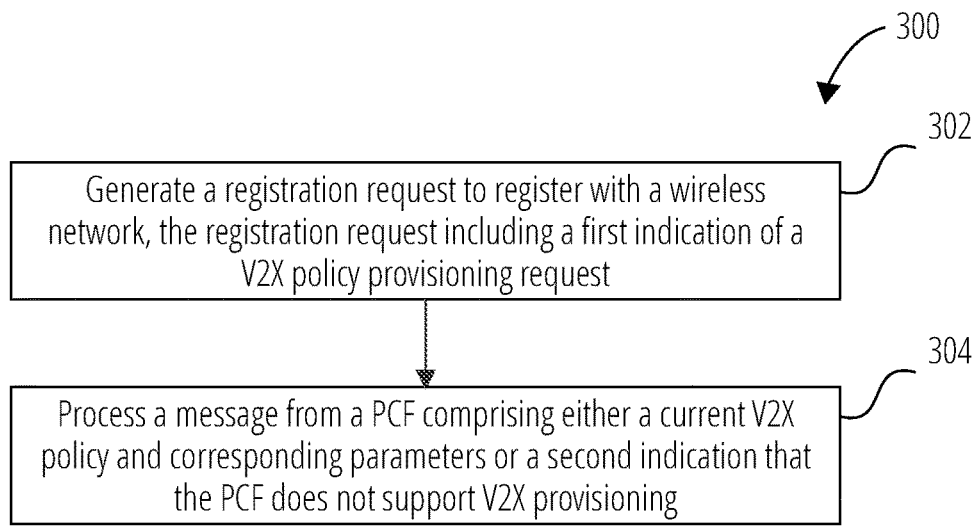
FIG. 3 is a flow diagram illustrating a method for a UE in accordance with one embodiment.

FIG. 3 is a flow diagram illustrating a method 300 for a UE according to one embodiment. In block 302, the method 300 generates a registration request to register with a wireless network. The registration request includes a first indication of a V2X policy provisioning request. In block 304, the method 300 processes a message from a PCF comprising either a current V2X policy and corresponding parameters or a second indication that the PCF does not support V2X provisioning.

Figure 4:
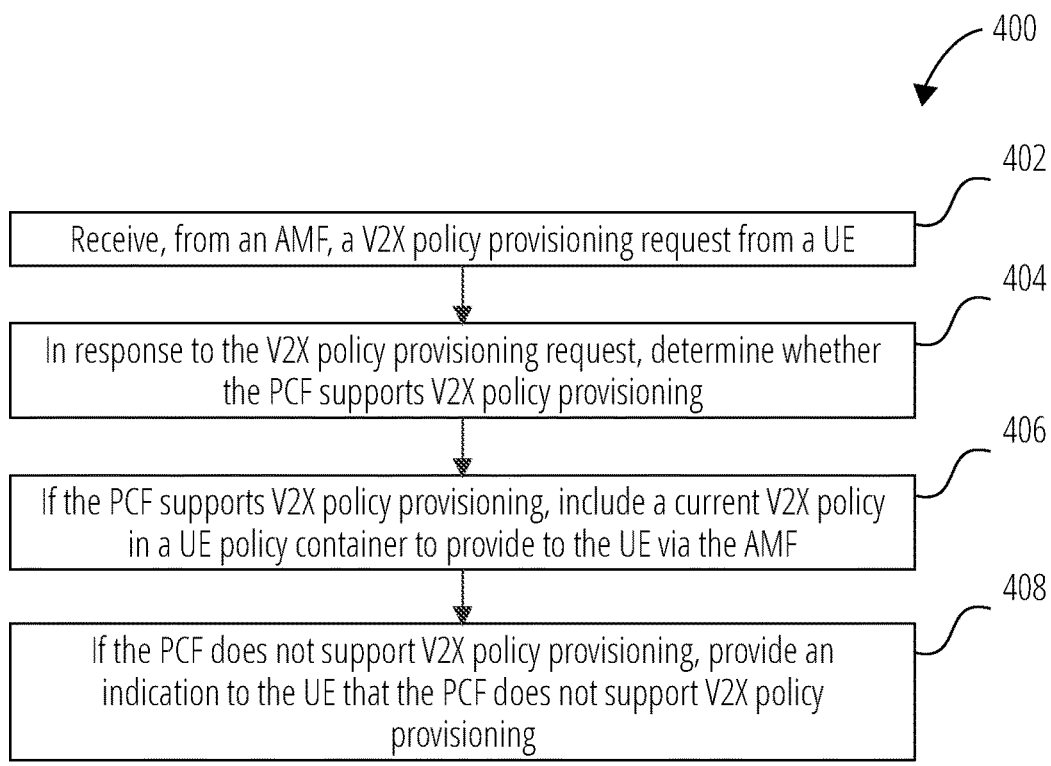
FIG. 4 is a flowchart illustrating a method for a PCF in a wireless network in accordance with one embodiment.

FIG. 4 is a flowchart illustrating a method 400 for a PCF in a wireless network according to one embodiment. In block 402, the method 400 receives, from an AMF, a V2X policy provisioning request from a UE. In block 404, in response to the V2X policy provisioning request, the method 400 determines whether the PCF supports V2X policy provisioning. In block 406, if the PCF supports the V2X policy provisioning, the method 400 includes a current V2X policy in a UE policy container to provide to the UE via the AMF. In block 408, if the PCF does not support the V2X policy provisions, the method 400 provides an indication to the UE that the PCF does not support the V2X policy provisioning.

Figure 5:
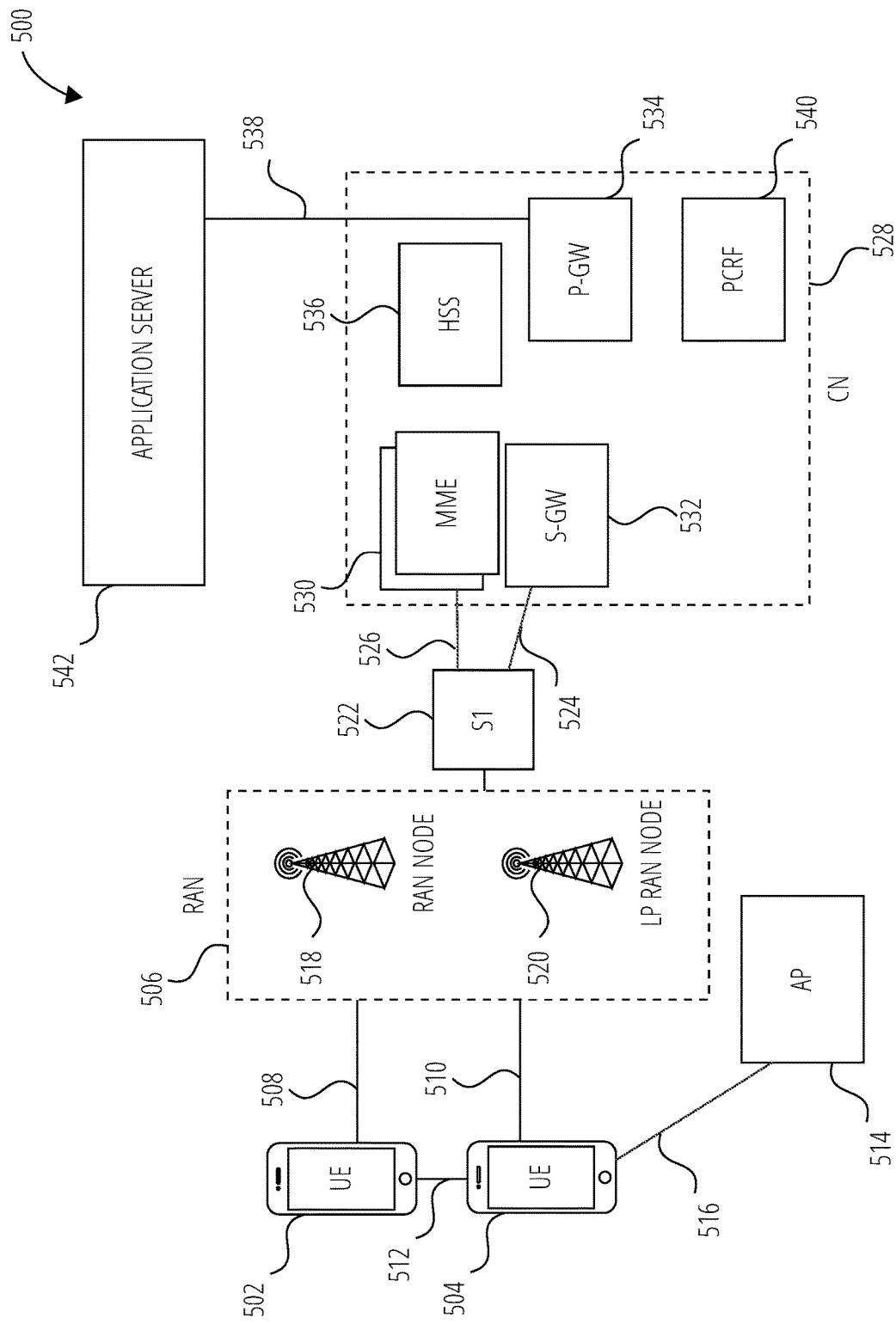
FIG. 5 illustrates a system in accordance with one embodiment.

FIG. 5 illustrates an architecture of a system 500 of a network in accordance with some embodiments. The system 500 includes one or more user equipment (UE), shown in this example as a UE 502 and a UE 504. The UE 502 and the UE 504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 502 and the UE 504 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and the UE 504 may be configured to connect, e.g., communicatively couple, with a radio access network (RAN), shown as RAN 506. The RAN 506 may be, for example, an Evolved Universal Mobile Telecommunications System (UMTS) Terrestrial Radio Access Network (E-UTRAN), a NextGen (NG) RAN (NG RAN), or some other type of RAN. The UE 502 and the UE 504 utilize connection 508 and connection 510, respectively, each of which comprises a physical communications interface or layer (discussed in further detail below); in this example, the connection 508 and the connection 510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 502 and the UE 504 may further directly exchange communication data via a ProSe interface 512. The ProSe interface 512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 504 is shown to be configured to access an access point (AP), shown as AP 514, via connection 516. The connection 516 can comprise a local wireless connection, such as a connection consistent with any IEEE 802.11 protocol, wherein the AP 514 would comprise a wireless fidelity (WiFi®) router. In this example, the AP 514 may be connected to the Internet without connecting to the core network of the wireless system (described in further detail below).

The RAN 506 can include one or more access nodes that enable the connection 508 and the connection 510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 506 may include one or more RAN nodes for providing macrocells, e.g., macro RAN node 518, and one or more RAN nodes for providing femtocells or picocells (e.g., cells having smaller coverage areas, smaller user capacity, or higher bandwidth compared to macrocells), e.g., a low power (LP) RAN node such as LP RAN node 520.

Any of the macro RAN node 518 and the LP RAN node 520 can terminate the air interface protocol and can be the first point of contact for the UE 502 and the UE 504. In some embodiments, any of the macro RAN node 518 and the LP RAN node 520 can fulfill various logical functions for the RAN 506 including, but not limited to, radio network controller (RNC) functions such as radio bearer management, uplink and downlink dynamic radio resource management and data packet scheduling, and mobility management.

In accordance with some embodiments, the UE 502 and the UE 504 can be configured to communicate using Orthogonal Frequency-Division Multiplexing (OFDM) communication signals with each other or with any of the macro RAN node 518 and the LP RAN node 520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 518 and the LP RAN node 520 to the UE 502 and the UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 502 and the UE 504. The physical downlink control channel (PDCCH) may carry information about the transport format and resource allocations related to the PDSCH channel, among other things. It may also inform the UE 502 and the UE 504 about the transport format, resource allocation, and H-ARQ (Hybrid Automatic Repeat Request) information related to the uplink shared channel. Typically, downlink scheduling (assigning control and shared channel resource blocks to the UE 504 within a cell) may be performed at any of the macro RAN node 518 and the LP RAN node 520 based on channel quality information fed back from any of the UE 502 and UE 504. The downlink resource assignment information may be sent on the PDCCH used for (e.g., assigned to) each of the UE 502 and the UE 504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 506 is communicatively coupled to a core network (CN), shown as CN 528—via an S1 interface 522. In embodiments, the CN 528 may be an evolved packet core (EPC) network, a NextGen Packet Core (NPC) network, or some other type of CN. In this embodiment the S1 interface 522 is split into two parts: the S1-U interface 524, which carries traffic data between the macro RAN node 518 and the LP RAN node 520 and a serving gateway (S-GW), shown as S-GW 532, and an S1-mobility management entity (MME) interface, shown as S1-MME interface 526, which is a signaling interface between the macro RAN node 518 and LP RAN node 520 and the MME(s) 530.

In this embodiment, the CN 528 comprises the MME(s) 530, the S-GW 532, a Packet Data Network (PDN) Gateway (P-GW) (shown as P-GW 534), and a home subscriber server (HSS) (shown as HSS 536). The MME(s) 530 may be similar in function to the control plane of legacy Serving General Packet Radio Service (GPRS) Support Nodes (SGSN). The MME(s) 530 may manage mobility aspects in access such as gateway selection and tracking area list management. The HSS 536 may comprise a database for network users, including subscription-related information to support the network entities' handling of communication sessions. The CN 528 may comprise one or several HSS 536, depending on the number of mobile subscribers, on the capacity of the equipment, on the organization of the network, etc. For example, the HSS 536 can provide support for routing/roaming, authentication, authorization, naming/addressing resolution, location dependencies, etc.

The S-GW 532 may terminate the S1 interface 322 towards the RAN 506, and routes data packets between the RAN 506 and the CN 528. In addition, the S-GW 532 may be a local mobility anchor point for inter-RAN node handovers and also may provide an anchor for inter-3GPP mobility. Other responsibilities may include lawful intercept, charging, and some policy enforcement.

The P-GW 534 may terminate an SGi interface toward a PDN. The P-GW 534 may route data packets between the CN 528 (e.g., an EPC network) and external networks such as a network including the application server 542 (alternatively referred to as application function (AF)) via an Internet Protocol (IP) interface (shown as IP communications interface 538). Generally, an application server 542 may be an element offering applications that use IP bearer resources with the core network (e.g., UMTS Packet Services (PS) domain, LTE PS data services, etc.). In this embodiment, the P-GW 534 is shown to be communicatively coupled to an application server 542 via an IP communications interface 538. The application server 542 can also be configured to support one or more communication services (e.g., Voice-over-Internet Protocol (VoIP) sessions, PTT sessions, group communication sessions, social networking services, etc.) for the UE 502 and the UE 504 via the CN 528.

The P-GW 534 may further be a node for policy enforcement and charging data collection. A Policy and Charging Enforcement Function (PCRF) (shown as PCRF 540) is the policy and charging control element of the CN 528. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 540 may be communicatively coupled to the application server 542 via the P-GW 534. The application server 542 may signal the PCRF 540 to indicate a new service flow and select the appropriate Quality of Service (QoS) and charging parameters. The PCRF 540 may provision this rule into a Policy and Charging Enforcement Function (PCEF) (not shown) with the appropriate traffic flow template (TFT) and QoS class of identifier (QCI), which commences the QoS and charging as specified by the application server 542.

Figure 6:
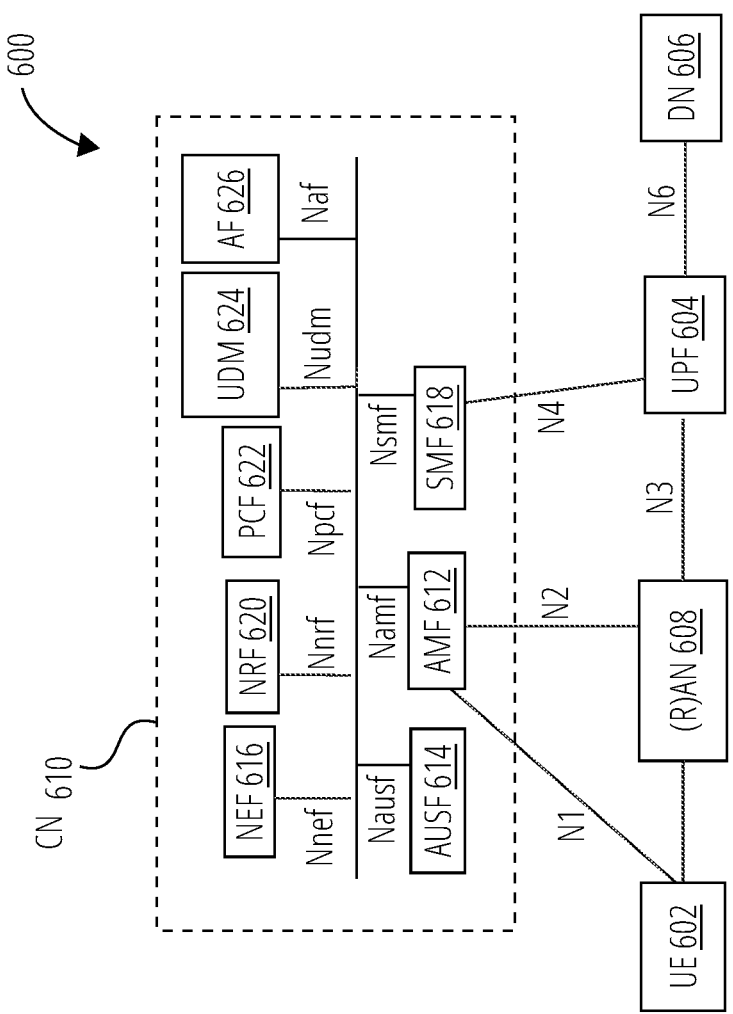
FIG. 6 illustrates a system in accordance with one embodiment.

FIG. 6 illustrates an architecture of a system 600 of a network in accordance with some embodiments. The system 600 is shown to include a UE 602, which may be the same or similar to the UE 502 and the UE 504 discussed previously; a 5G access node or RAN node (shown as (R)AN node 608), which may be the same or similar to the macro RAN node 518 and/or the LP RAN node 520 discussed previously; a User Plane Function (shown as UPF 604); a Data Network (DN 606), which may be, for example, operator services, Internet access or 3rd party services; and a 5G Core Network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services. DN 606 may include, or be similar to the application server 542 discussed previously.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (NI) signaling, and perform NAS ciphering and integrity protection.

AMF 612 may also support NAS signaling with a UE 602 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NFs.

As discussed previously, the CN 610 may include an SMSF, which may be responsible for SMS subscription checking and verification, and relaying SM messages to/from the UE 602 to/from other entities, such as an SMS-GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3:

Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME (e.g., MME(s) 530) and the AMF 612 in order to enable interworking between CN 610 and CN 528.

Although not shown by FIG. 6, the system 600 may include multiple RAN nodes (such as (R)AN node 608) wherein an Xn interface is defined between two or more (R)AN node 608 (e.g., gNBs and the like) that connecting to 5GC 410, between a (R)AN node 608 (e.g., gNB) connecting to CN 610 and an eNB (e.g., a macro RAN node 518 of FIG. 5), and/or between two eNBs connecting to CN 610.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
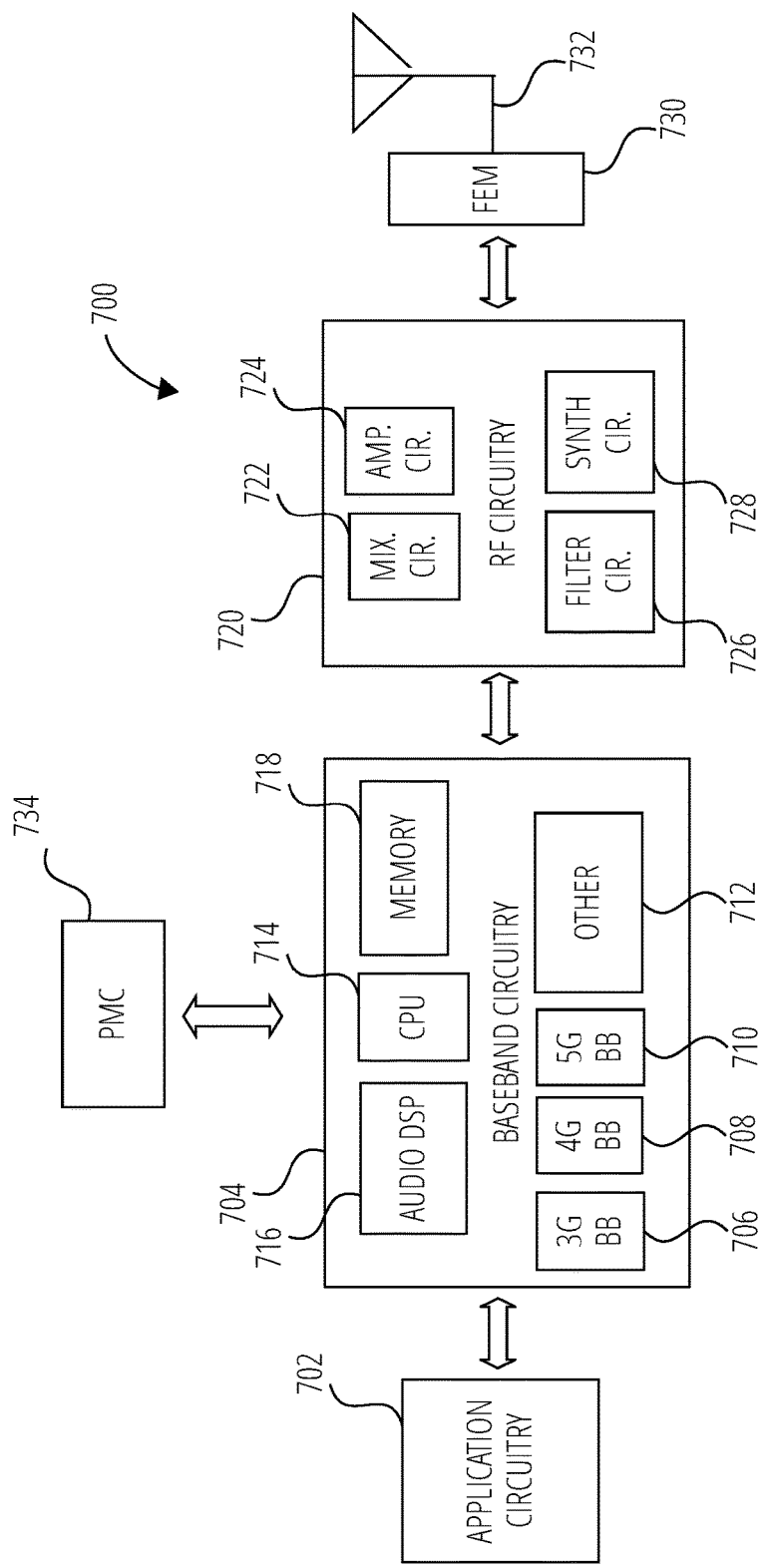
FIG. 7 illustrates a device in accordance with one embodiment.

FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission.

In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
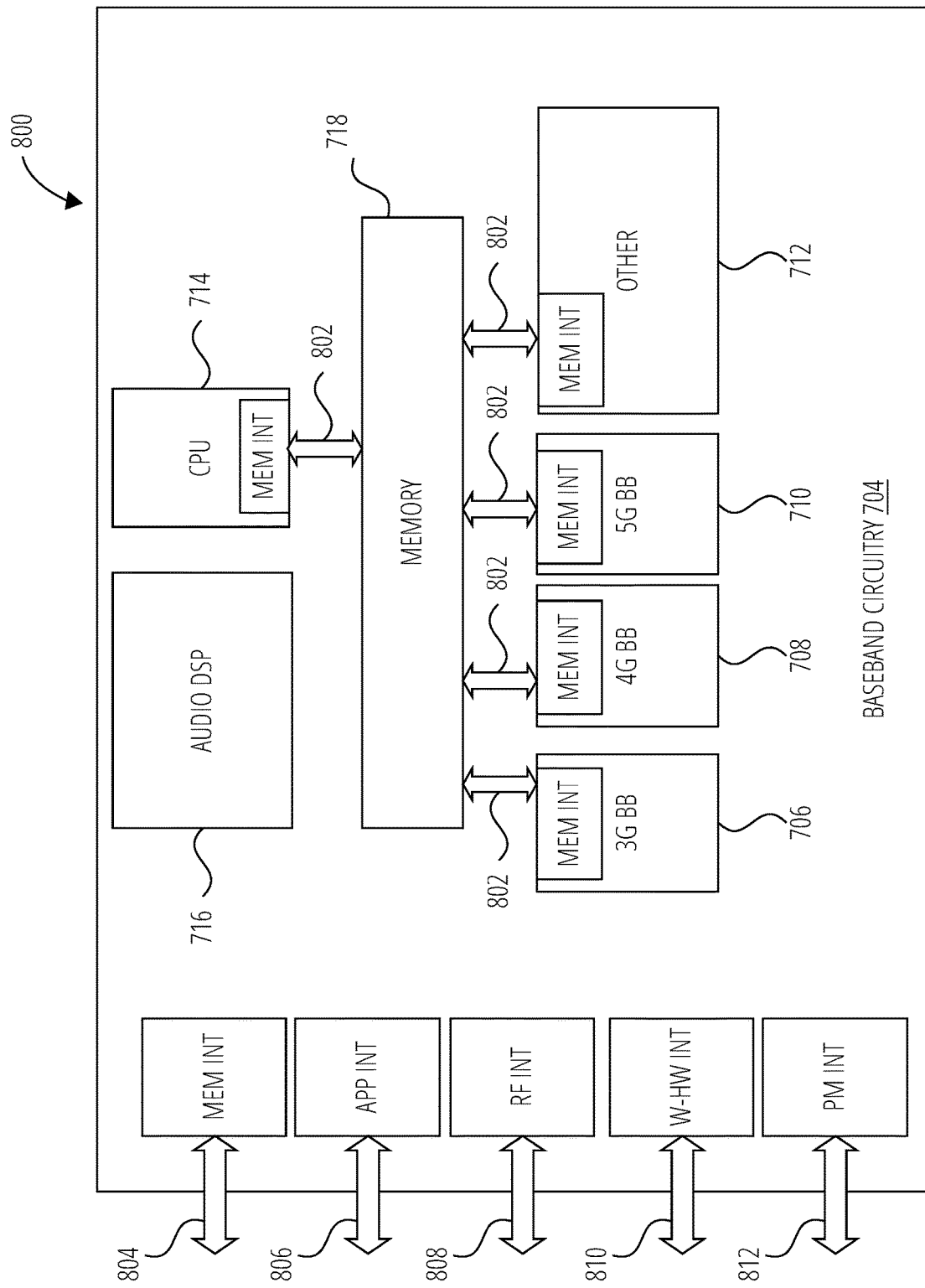
FIG. 8 illustrates example interfaces in accordance with one embodiment.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
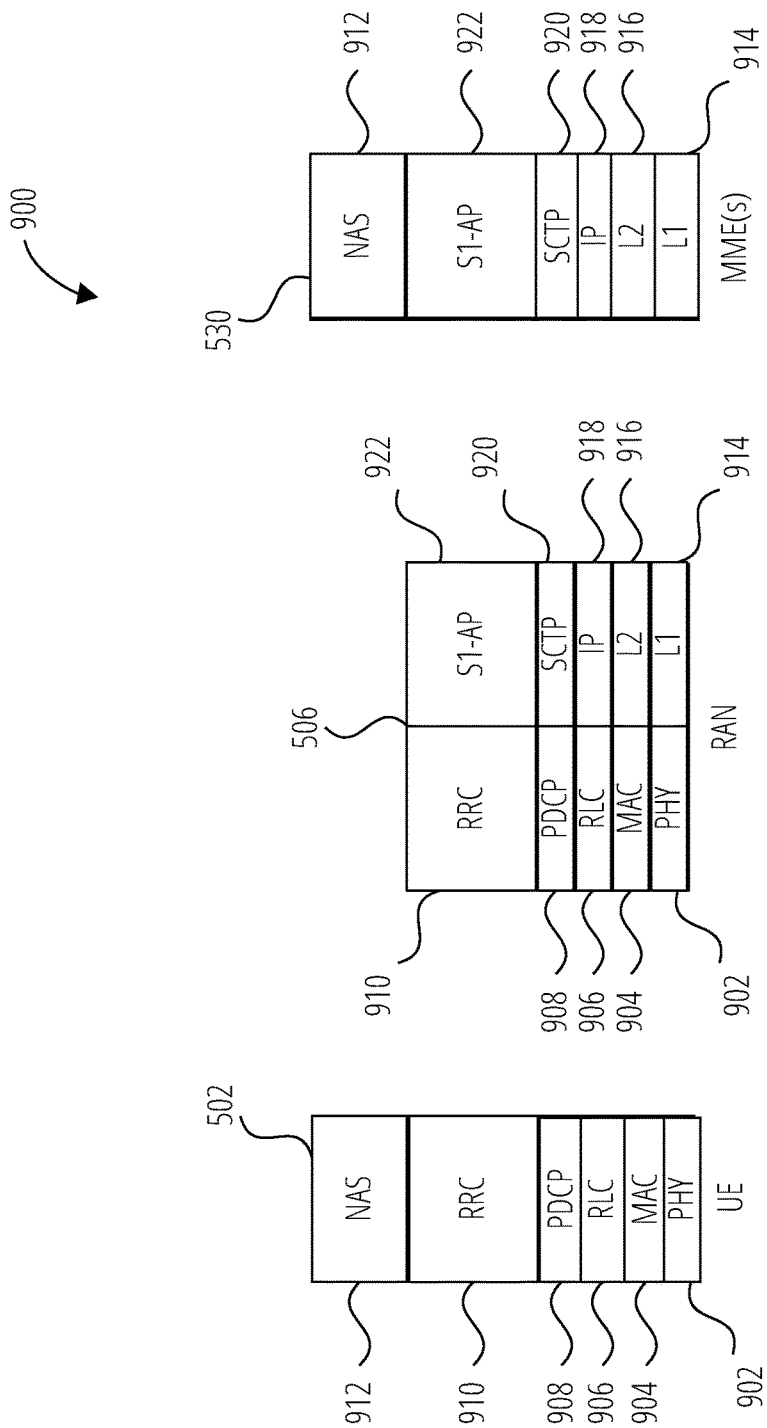
FIG. 9 illustrates a control plane in accordance with one embodiment.

FIG. 9 is an illustration of a control plane protocol stack in accordance with some embodiments. In this embodiment, a control plane 900 is shown as a communications protocol stack between the UE 502 (or alternatively, the UE 504), the RAN 506 (e.g., the macro RAN node 518 and/or the LP RAN node 520), and the MME(s) 530.

A PHY layer 902 may transmit or receive information used by the MAC layer 904 over one or more air interfaces. The PHY layer 902 may further perform link adaptation or adaptive modulation and coding (AMC), power control, cell search (e.g., for initial synchronization and handover purposes), and other measurements used by higher layers, such as an RRC layer 910. The PHY layer 902 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 904 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 906 may operate in a plurality of modes of operation, including: Transparent Mode (TM), Unacknowledged Mode (UM), and Acknowledged Mode (AM). The RLC layer 906 may execute transfer of upper layer protocol data units (PDUs), error correction through automatic repeat request (ARQ) for AM data transfers, and concatenation, segmentation and reassembly of RLC SDUs for UM and AM data transfers. The RLC layer 906 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 908 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 910 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 502 and the RAN 506 may utilize a Uu interface (e.g., an LTE-Uu or NG(-Uu interface) to exchange control plane data via a protocol stack comprising the PHY layer 902, the MAC layer 904, the RLC layer 906, the PDCP layer 908, and the RRC layer 910.

In the embodiment shown, the non-access stratum (NAS) protocols (NAS protocols 912) form the highest stratum of the control plane between the UE 502 and the MME(s) 530. The NAS protocols 912 support the mobility of the UE 502 and the session management procedures to establish and maintain IP connectivity between the UE 502 and the P-GW 534.

The S1 Application Protocol (S1-AP) layer (S1-AP layer 922) may support the functions of the S1 interface and comprise Elementary Procedures (EPs). An EP is a unit of interaction between the RAN 506 and the CN 528. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 920) may ensure reliable delivery of signaling messages between the RAN 506 and the MME(s) 530 based, in part, on the IP protocol, supported by an IP layer 918. An L2 layer 916 and an L1 layer 914 may refer to communication links (e.g., wired or wireless) used by the RAN node and the MME to exchange information.

The RAN 506 and the MME(s) 530 may utilize an S1-MME interface to exchange control plane data via a protocol stack comprising the L1 layer 914, the L2 layer 916, the IP layer 918, the SCTP layer 920, and the S1-AP layer 922.

Figure 10:
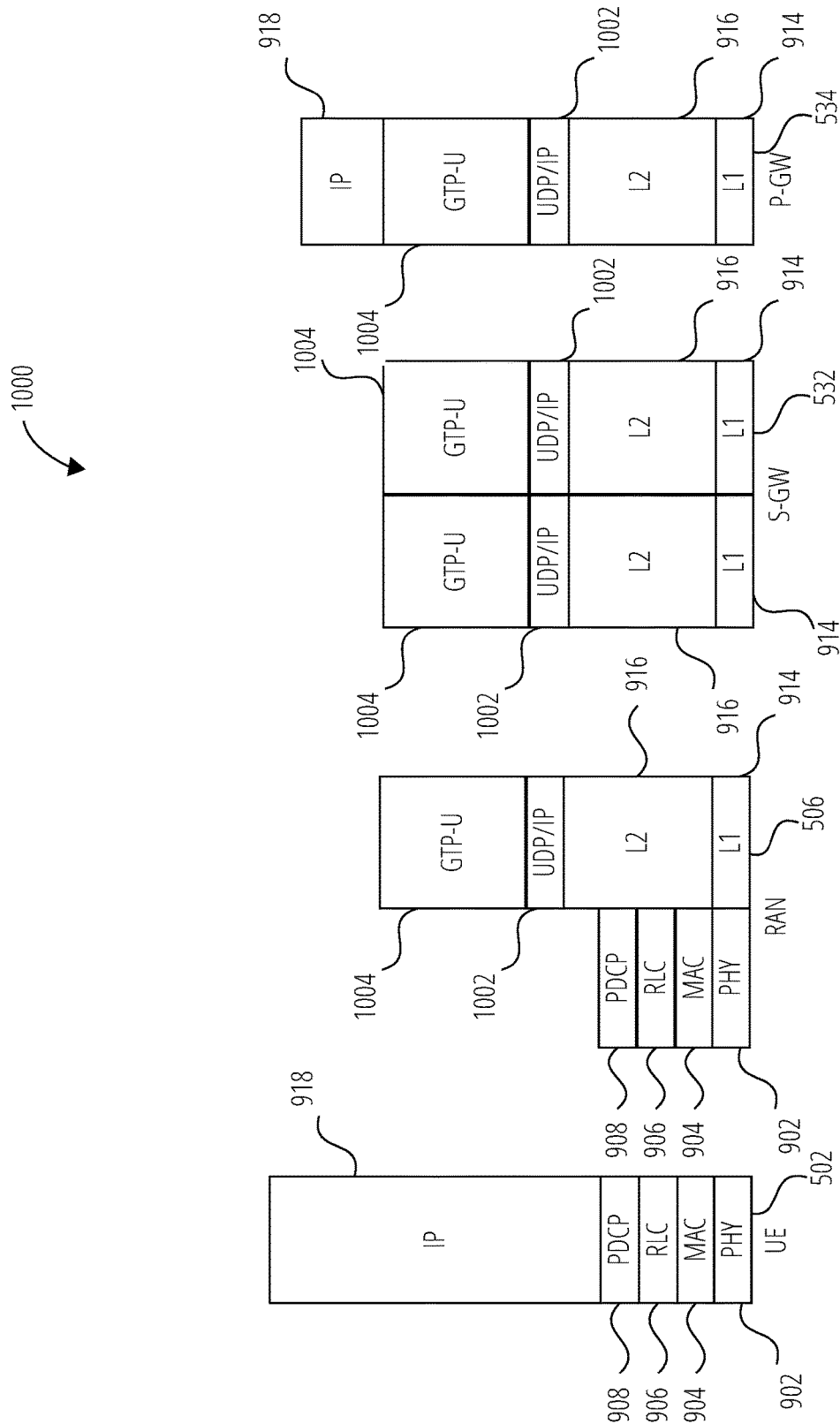
FIG. 10 illustrates a user plane in accordance with one embodiment.

FIG. 10 is an illustration of a user plane protocol stack in accordance with some embodiments. In this embodiment, a user plane 1000 is shown as a communications protocol stack between the UE 502 (or alternatively, the UE 504), the RAN 506 (e.g., the macro RAN node 518 and/or the LP RAN node 520), the S-GW 532, and the P-GW 534. The user plane 1000 may utilize at least some of the same protocol layers as the control plane 900. For example, the UE 502 and the RAN 506 may utilize a Uu interface (e.g., an LTE-Uu interface) to exchange user plane data via a protocol stack comprising the PHY layer 902, the MAC layer 904, the RLC layer 906, the PDCP layer 908.

The General Packet Radio Service (GPRS) Tunneling Protocol for the user plane (GTP-U) layer (GTP-U layer 1004) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1002) may provide checksums for data integrity, port numbers for addressing different functions at the source and destination, and encryption and authentication on the selected data flows. The RAN 506 and the S-GW 532 may utilize an S1-U interface to exchange user plane data via a protocol stack comprising the L1 layer 914, the L2 layer 916, the UDP/IP layer 1002, and the GTP-U layer 1004. The S-GW 532 and the P-GW 534 may utilize an S5/S8a interface to exchange user plane data via a protocol stack comprising the L1 layer 914, the L2 layer 916, the UDP/IP layer 1002, and the GTP-U layer 1004. As discussed above with respect to FIG. 9, NAS protocols support the mobility of the UE 502 and the session management procedures to establish and maintain IP connectivity between the UE 502 and the P-GW 534.

Figure 11:
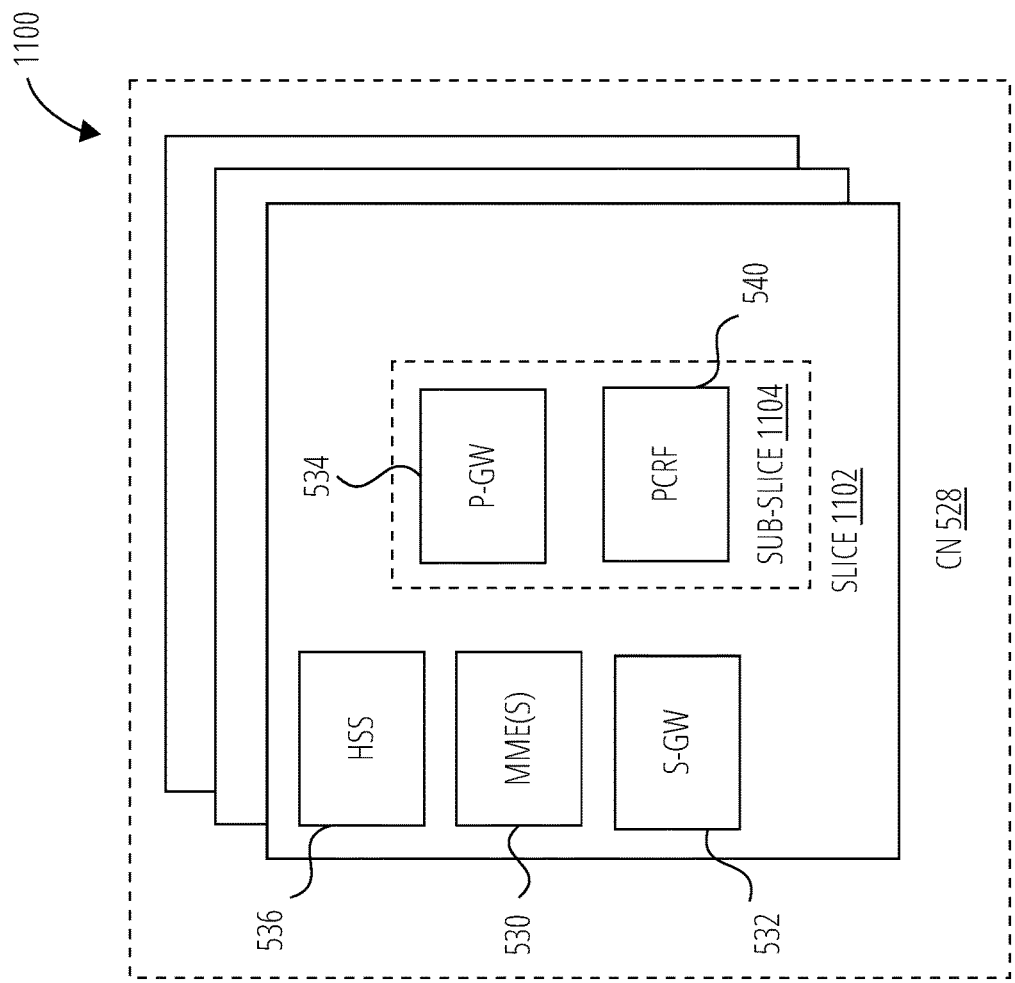
FIG. 11 illustrates a components in accordance with one embodiment.

FIG. 11 illustrates components 1100 of a core network in accordance with some embodiments. The components of the CN 528 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 528 may be referred to as a network slice 1102 (e.g., the network slice 1102 is shown to include the HSS 536, the MME(s) 530, and the S-GW 532). A logical instantiation of a portion of the CN 528 may be referred to as a network sub-slice 1104 (e.g., the network sub-slice 1104 is shown to include the P-GW 534 and the PCRF 540).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
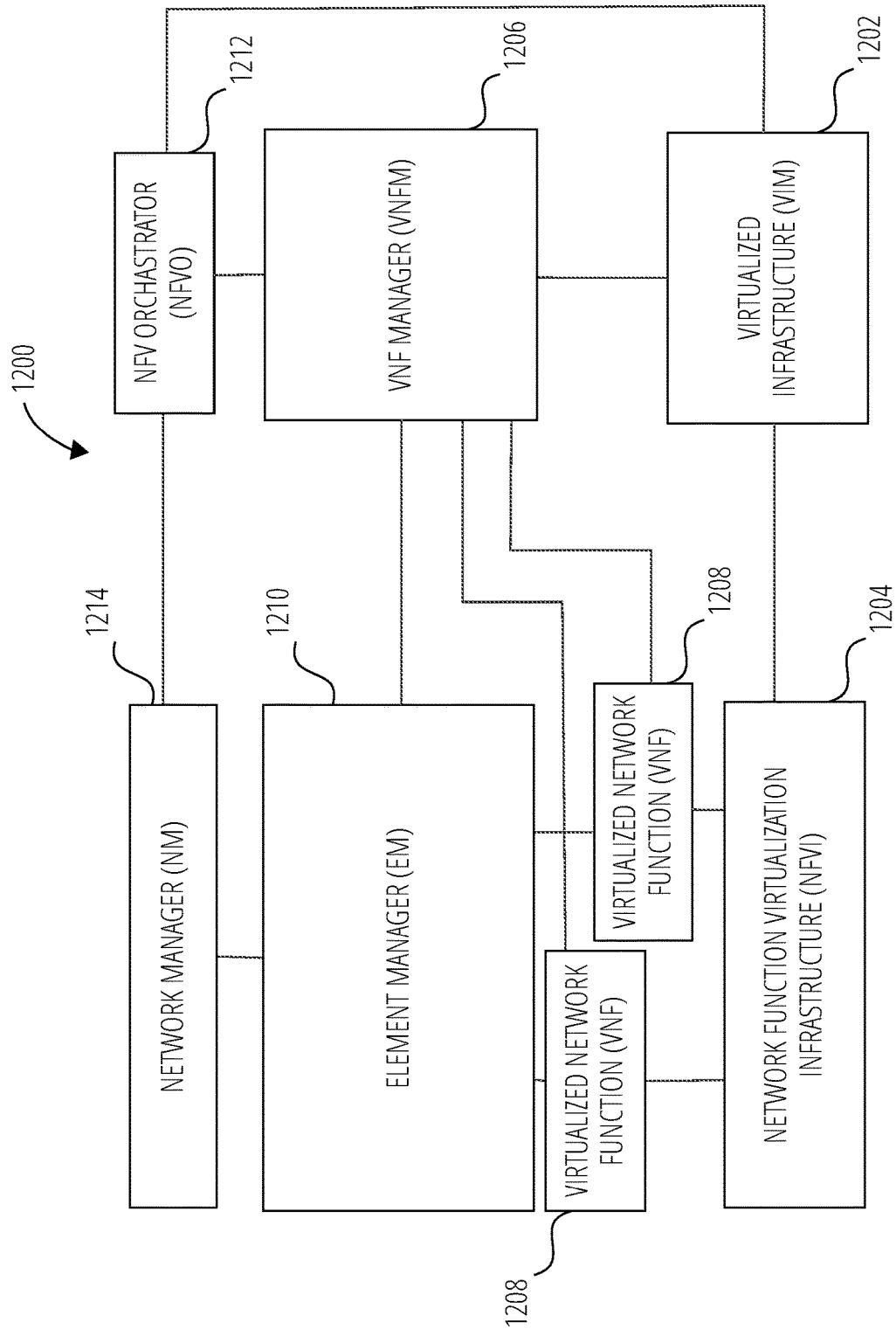
FIG. 12 illustrates a system in accordance with one embodiment.

FIG. 12 is a block diagram illustrating components, according to some example embodiments, of a system 1200 to support NFV. The system 1200 is illustrated as including a virtualized infrastructure manager (shown as VIM 1202), a network function virtualization infrastructure (shown as NFVI 1204), a VNF manager (shown as VNFM 1206), virtualized network functions (shown as VNF 1208), an element manager (shown as EM 1210), an NFV Orchestrator (shown as NFVO 1212), and a network manager (shown as NM 1214).

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1206 may manage the VNF 1208. The VNF 1208 may be used to execute EPC components/functions. The VNFM 1206 may manage the life cycle of the VNF 1208 and track performance, fault and security of the virtual aspects of VNF 1208. The EM 1210 may track the performance, fault and security of the functional aspects of VNF 1208. The tracking data from the VNFM 1206 and the EM 1210 may comprise, for example, performance measurement (PM) data used by the VIM 1202 or the NFVI 1204. Both the VNFM 1206 and the EM 1210 can scale up/down the quantity of VNFs of the system 1200. The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
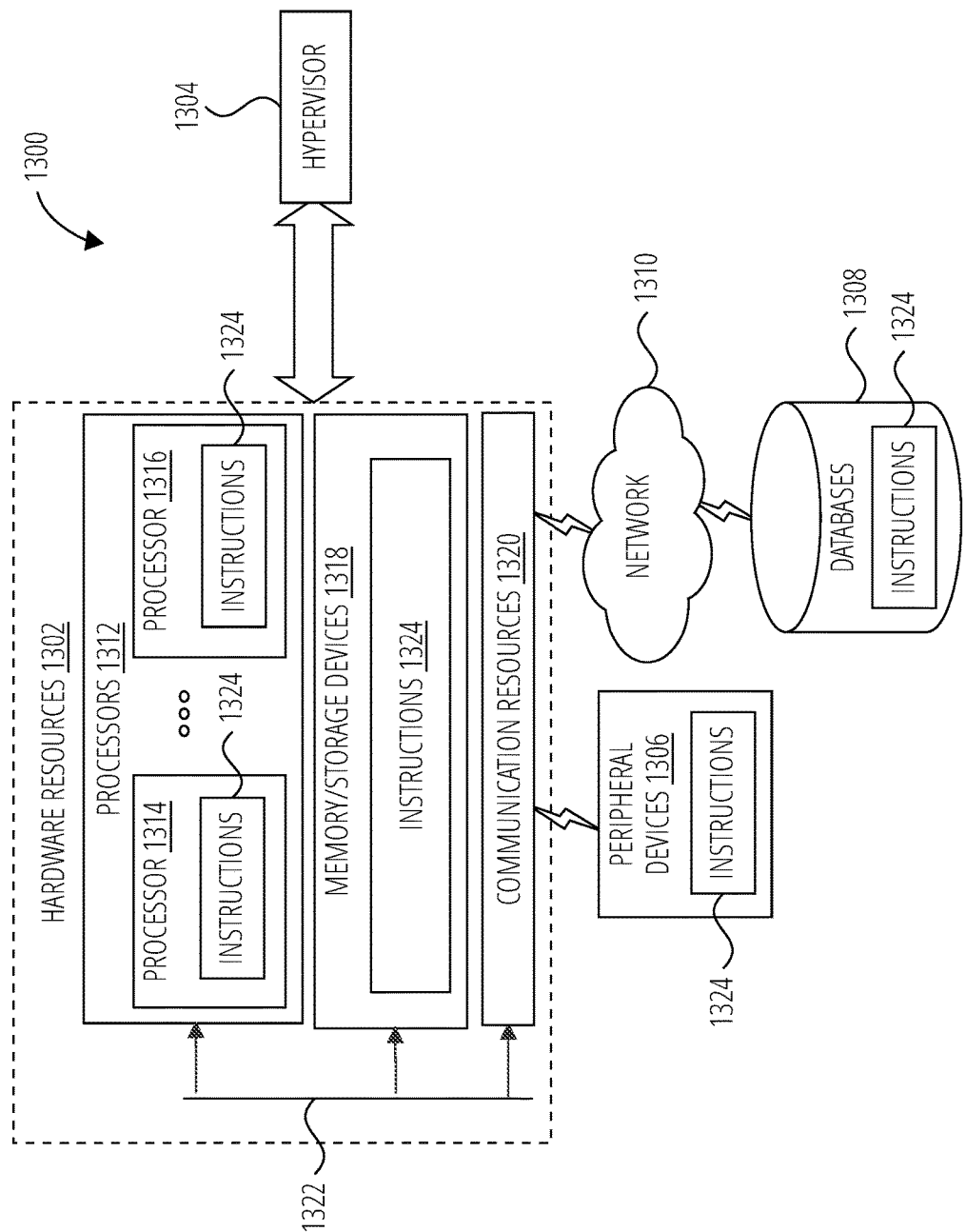
FIG. 13 illustrates a components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302. The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316. The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components. Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

The following examples pertain to further embodiments.

Example 1 is an apparatus for a user equipment (UE). The apparatus includes a memory interface and a processor. The memory interface to send or receive, to or from a memory device, data for a vehicle-to-everything (V2X) policy provisioning request. The processor to: generate a registration request to register with a wireless network, the registration request including a first indication of the V2X policy provisioning request; and process a message from a policy control function (PCF) comprising either a current V2X policy and corresponding parameters or a second indication that the PCF does not support V2X provisioning.

Example 2 is the apparatus of example 1, wherein the V2X policy provision request is included in a transparent container sent to an access and mobility management function (AMF) in a non-access stratum (NAS) message.

Example 3 is the apparatus of example 2, wherein the transparent container comprises a UE policy container.

Example 4 is the apparatus of example 1, wherein the current V2X policy and corresponding parameters are included in a UE policy container received from the PCF via an access and mobility management function (AMF).

Example 5 is the apparatus of example 4, wherein the current V2X policy and corresponding parameters correspond to one or more types of policy requested by the UE.

Example 6 is the apparatus of example 4, wherein the current V2X policy and corresponding parameters in the UE policy container are received from the AMF in a non-access stratum (NAS) downlink transport message.

Example 7 is the apparatus of example 1, wherein the second indication that the PCF does not support V2X provision indicates that the current V2X policy is not available in the PCF.

Example 8 is the apparatus of example 1, wherein the second indication that the PCF does not support V2X provision is received in a UE policy container from the PCF via an access and mobility management function (AMF) in a non-access stratum (NAS) downlink transport message.

Example 9 is the apparatus of example 1, wherein the second indication that the PCF does not support V2X provision is received from an access and mobility management function (AMF) in a registration accept message of a registration procedure initiated by the registration request, wherein the second indication is not transparent to the AMF.

Example 10 is the apparatus of example 1, wherein the current V2X policy and corresponding parameters includes a mapping of V2X services to one or more a protocol data unit (PDU) session type.

Example 11 is the apparatus of example 10, wherein the one or more PDU session type is selected from an internet protocol (IP) type and an unstructured type.

Example 12 is the apparatus of example 1, wherein the current V2X policy and corresponding parameters includes a mapping of V2X services to one or more session and service continuity (SSC) mode.

Example 13 is the apparatus of example 1, wherein the current V2X policy and corresponding parameters includes a mapping of V2X services to one or more single network slice selection assistance information (S-NSSAI).

Example 14 is the apparatus of example 1, wherein the current V2X policy and corresponding parameters includes a mapping of V2X services to one or more data network name (DNN).

Example 15 is the apparatus of example 1, wherein the current V2X policy and corresponding parameters includes a mapping of V2X services to one or more radio access technology (RAT) preference.

Example 16 is the apparatus of example 15, wherein the one or more RAT preference is selected from an Evolved Universal Terrestrial Radio Access (E-UTRA) RAT type and a new radio RAT type.

Example 17 is the apparatus of example 1, wherein if a protocol data unit (PDU) session type associated with the registration request is of an internet protocol (IP) type, the current V2X policy and corresponding parameters includes map information for unicast.

Example 18 is the apparatus of example 1, wherein if a protocol data unit (PDU) session type associated with the registration request is of an internet protocol (IP) type, the current V2X policy and corresponding parameters includes a list of fully qualified domain names (FQDNs) or IP addresses of one or more V2X application server, served geographical area information, and a list of public land mobile networks (PLMNs) corresponding to the current V2X policy and corresponding parameters.

Example 19 is a method for a policy control function (PCF) in a wireless network. The method includes: receiving, from an access and mobility management function (AMF), a vehicle-to-everything (V2X) policy provisioning request from a user equipment (UE); in response to the V2X policy provisioning request, determining whether the PCF supports V2X policy provisioning; if the PCF supports the V2X policy provisioning, including a current V2X policy in a UE policy container to provide to the UE via the AMF; and if the PCF does not support the V2X policy provisioning, providing an indication to the UE that the PCF does not support the V2X policy provisioning.

Example 20 is the method of example 19, further comprising including the indication in the UE policy container.

Example 21 is the method of example 19, wherein the V2X policy provisioning request is included in a registration request from the UE in a transparent container forwarded by the AMF, the method further comprising instructing the AMF to include the indication in a registration accept message corresponding to the registration request.

Example 22 is the method of example 19, wherein the current V2X policy includes a mapping of V2X services to one or more a protocol data unit (PDU) session type.

Example 23 is the method of example 22, wherein the one or more PDU session type is selected from an internet protocol (IP) type and an unstructured type.

Example 24 is the method of example 19, wherein the current V2X policy includes a mapping of V2X services to one or more session and service continuity (SSC) mode.

Example 25 is the method of example 19, wherein the current V2X policy includes a mapping of V2X services to one or more single network slice selection assistance information (S-NSSAI).

Example 26 is the method of example 19, wherein the current V2X policy includes a mapping of V2X services to one or more data network name (DNN).

Example 27 is the method of example 19, wherein the current V2X policy and corresponding parameters includes a mapping of V2X services to one or more radio access technology (RAT) preference.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments. Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE), the apparatus comprising:
   a memory interface to send or receive, to or from a memory device, data for a vehicle-to-everything (V2X) policy provisioning request; and
   a processor to:
   generate a registration request to register with a wireless network, the registration request including a first indication of the V2X policy provisioning request; and
   process a message from a policy control function (PCF) comprising either a current V2X policy and corresponding parameters or a second indication that the PCF does not support V2X provisioning,
   wherein the current V2X policy and the corresponding parameters includes a mapping of V2X services to one or more data network name (DNN).

2. The apparatus of claim 1, wherein the V2X policy provisioning request is included in a transparent container sent to an access and mobility management function (AMF) in a non-access stratum (NAS) message.

3. The apparatus of claim 2, wherein the transparent container comprises a UE policy container.

4. The apparatus of claim 1, wherein the current V2X policy and the corresponding parameters are included in a UE policy container received from the PCF via an access and mobility management function (AMF).

5. The apparatus of claim 4, wherein the current V2X policy and the corresponding parameters correspond to one or more types of policy requested by the UE.

6. The apparatus of claim 4, wherein the current V2X policy and the corresponding parameters in the UE policy container are received from the AMF in a non-access stratum (NAS) downlink transport message.

7. The apparatus of claim 1, wherein the second indication that the PCF does not support V2X provision indicates that the current V2X policy is not available in the PCF.

8. The apparatus of claim 1, wherein the second indication that the PCF does not support V2X provision is received in a UE policy container from the PCF via an access and mobility management function (AMF) in a non-access stratum (NAS) downlink transport message.

9. The apparatus of claim 1, wherein the second indication that the PCF does not support V2X provision is received from an access and mobility management function (AMF) in a registration accept message of a registration procedure initiated by the registration request, wherein the second indication is not transparent to the AMF.

10. The apparatus of claim 1, wherein the current V2X policy and the corresponding parameters includes a mapping of V2X services to one or more protocol data unit (PDU) session type.

11. The apparatus of claim 10, wherein the one or more PDU session type is selected from an internet protocol (IP) type and an unstructured type.

12. The apparatus of claim 1, wherein the current V2X policy and the corresponding parameters includes a mapping of V2X services to one or more session and service continuity (SSC) mode.

13. The apparatus of claim 1, wherein the current V2X policy and the corresponding parameters includes a mapping of V2X services to one or more single network slice selection assistance information (S-NSSAI).

14. The apparatus of claim 1, wherein the current V2X policy and the corresponding parameters includes a mapping of V2X services to one or more radio access technology (RAT) preference.

15. The apparatus of claim 14, wherein the one or more RAT preference is selected from an Evolved Universal Terrestrial Radio Access (E-UTRA) RAT type and a new radio RAT type.

16. The apparatus of claim 1, wherein if a protocol data unit (PDU) session type associated with the registration request is of an internet protocol (IP) type, the current V2X policy and the corresponding parameters includes map information for unicast.

17. The apparatus of claim 1, wherein if a protocol data unit (PDU) session type associated with the registration request is of an internet protocol (IP) type, the current V2X policy and the corresponding parameters includes a list of fully qualified domain names (FQDNs) or IP addresses of one or more V2X application server, served geographical area information, and a list of public land mobile networks (PLMNs) corresponding to the current V2X policy and the corresponding parameters.

* * * * *